(12) United States Patent
Chang

(10) Patent No.: US 8,373,662 B2
(45) Date of Patent: Feb. 12, 2013

(54) ILLUMINATING PLUG AND BATTERY CHARGER USING THE SAME AND MOUSE USING THE SAME

(75) Inventor: Jen-Tsorng Chang, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 710 days.

(21) Appl. No.: 12/641,562

(22) Filed: Dec. 18, 2009

(65) Prior Publication Data

US 2010/0245247 A1  Sep. 30, 2010

(30) Foreign Application Priority Data

Mar. 25, 2009  (CN) .......................... 200910301113.4

(51) Int. Cl.
G06F 3/033 (2006.01)
(52) U.S. Cl. ........................................ 345/163; 362/253
(58) Field of Classification Search .................. None
See application file for complete search history.

(56) References Cited

U.S. PATENT DOCUMENTS

| 6,290,533 B1 * | 9/2001 | Major .......................... 439/490 |
| 8,105,106 B1 * | 1/2012 | Stoddard ....................... 439/490 |
| 2007/0002020 A1 * | 1/2007 | Ranta et al. .................. 345/166 |
| 2007/0211464 A1 * | 9/2007 | Tao ............................... 362/252 |

FOREIGN PATENT DOCUMENTS

CN          201048172 Y     4/2008

* cited by examiner

*Primary Examiner* — Adam R Giesy
(74) *Attorney, Agent, or Firm* — Altis Law Group, Inc.

(57) ABSTRACT

An illuminating plug includes a cable, a terminal electrically connected to the cable, an illuminating unit formed on the cable, a light guiding layer covering around the cable and optically coupled to the illuminating unit, and a reflecting layer covering the illuminating unit and the light guiding layer. The light guiding layer includes a light emitting surface formed adjacent to the terminal such that light emitting from the illuminating unit reaches the light emitting surface through the light guiding layer and emits out to illuminate at least the terminal.

20 Claims, 4 Drawing Sheets

ILLUMINATING PLUG AND BATTERY CHARGER USING THE SAME AND MOUSE USING THE SAME

BACKGROUND

1. Technical Field

The present disclosure relates to an illuminating plug, a battery charger using the same and a mouse using the same.

2. Description of Related Art

Power plugs normally includes a cable and a terminal connected to the cable. The terminal can electrically connect to an external circuit via a corresponding socket of the external circuit for providing or receiving electrical power. Concurrent with recent developments in portable electronic communication and information products, where the central theme goes for the utmost that is possible in minimization of size, weight and thickness, power plugs used thereof are becoming more compact. Therefore, when there is no light illuminating a compact plug, it is difficult for users to insert the compact plug into a corresponding socket at night or in darkness. This may results in inconvenient use.

It is thus desirable to provide an illuminating plug which can overcome the described limitations.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will now be made to the drawings to describe various inventive embodiments of the present disclosure in detail, wherein like numerals refer to like elements throughout.

Figure 1:
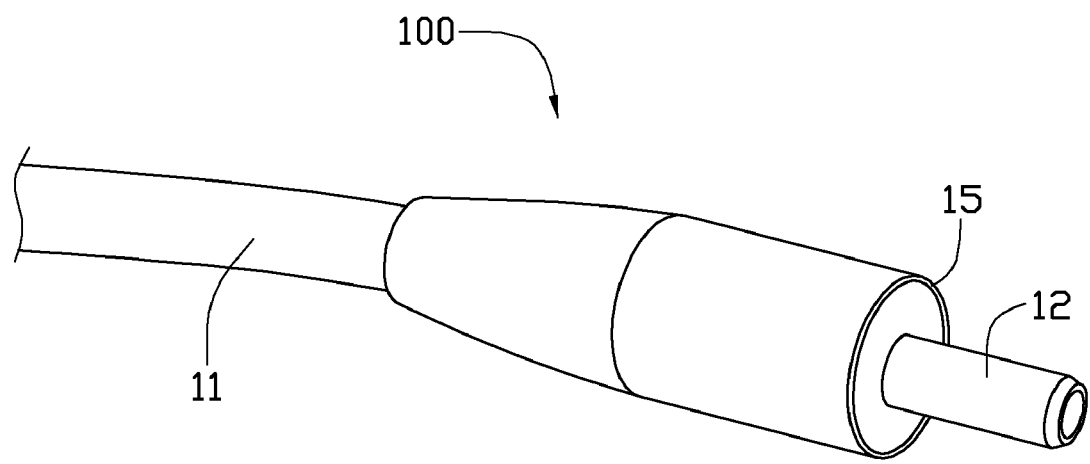
FIG. 1 is schematic, isometric view of an illuminating plug in accordance with one embodiment. [broader]
Figure 2:
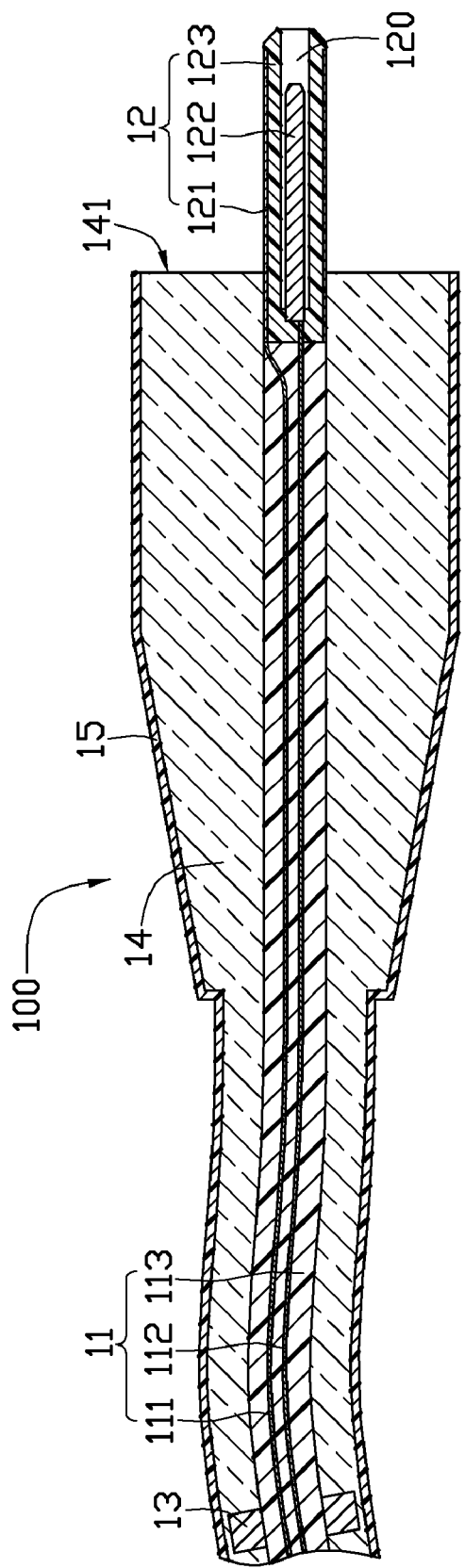
FIG. 2 is schematic, enlarged cross-sectional view of the illuminating plug of FIG. 1.

Referring to FIG. 1 and FIG. 2, an illuminating plug 100 in accordance with one embodiment includes a cable 11, a terminal 12, an illuminating unit 13, a light guiding layer 14, and a reflecting film 15.

The cable 11 includes a first wire 111, a second wire 112, and a first insulating layer 113 covering the first and the second wires 111, 112 for spacing and electrically insulating the first and the second wires 111, 112. The first and the second wires 111, 112 are made of electrically conductive materials, such as metal, for example.

The terminal 12 is column-shaped and formed at an end of the cable 11. In one alternating embodiment, the terminal 12 can be formed in other configurations or shapes according to shapes of the socket of the external circuit. An inserting hole 120 is defined along an axis of the column-shaped terminal 12. The terminal 12 includes a first electrode 121, a second electrode 122, and a second insulating layer 123. The first electrode 121 is formed around outer surface of the column-shaped terminal 12 and electrically connected to the first wire 111. The second electrode 122 is formed in the inserting hole 120 of the terminal 12 along the axis of the column-shaped terminal 12 and electrically connected to the second wire 112. The second insulating layer 123 is formed between the first and the second electrodes 121, 122 for electrically insulating the first and the second electrodes 121, 122. The first and the second electrodes 111, 112 are made of electric conduction materials such as metal. An end of the terminal 12 far away from the first and the second wires 111, 112 can removably electrically connect to an external circuit (not shown) via a corresponding socket of the external circuit for providing or receiving electrical power. The illuminating unit 13 is formed on the first insulating layer 113. The illuminating unit 13 can be a light emitting diode, a chip of a light emitting diode, or a module of a plurality of light emitting diodes. In one embodiment, a number of the light emitting diode may be one.

The light guiding layer 14 is hollow cylinder-shaped and covers around the cable 11 to optically couple the illuminating unit 13, for example, the light guiding layer 14 covers the illuminating unit 13. The light guiding layer 14 is made of transparent materials such as polymethyl methacrylate (PMMA). A light emitting surface 141 is formed at an end of the light guiding layer 141 adjacent to the terminal 12 and approximately perpendicular to the axis of the terminal 12. In this embodiment the light emitting surface 141 is ring-shaped.

The reflecting layer 15 is formed to cover the outer surface of the light guiding layer 14 for reflecting light emitting from the illuminating unit 13 back to the light guiding layer 14.

In operation, the illuminating unit 13 is electrically connected to a first external power supply to be powered. Some of the light emitted from the illuminating unit 13 reaches the light emitting surface 141 through the light guiding layer 14, thereby emitting out to illuminate the terminal 12 and a corresponding socket of a second external circuit in front of the terminal 12. Thus, such illumination allows the user to conveniently locate the corresponding socket in darkness. At the same time, some light emitted from the illuminating unit 13 reaches the reflecting layer 15, thereby reflecting back to the light guiding layer 14, then emitting out from the light emitting surface 141. Thus, all the light emitting from the illuminating unit 13 can emit out from the light emitting surface 141, thereby increasing a using efficiency of light. Furthermore, the light guiding layer 14 makes light emitting from the light emitting surface 141 more uniform.

In one alternating embodiment, the illuminating plug 100 further includes a switch electrically connected to the illuminating unit 13 for controlling an operation of the illuminating unit 13. For example, when the illuminating plug 100 is used in a bright environment and the terminal 12 does not need to be illuminated, a user can turn off the illuminating unit 13 by pressing the switch.

In another alternating embodiment, the light emitting surface 141 includes a plurality of micro-lenses formed thereon to focus the light emitting from the light emitting surface 141 to a top of the terminal 12.

Figure 3:
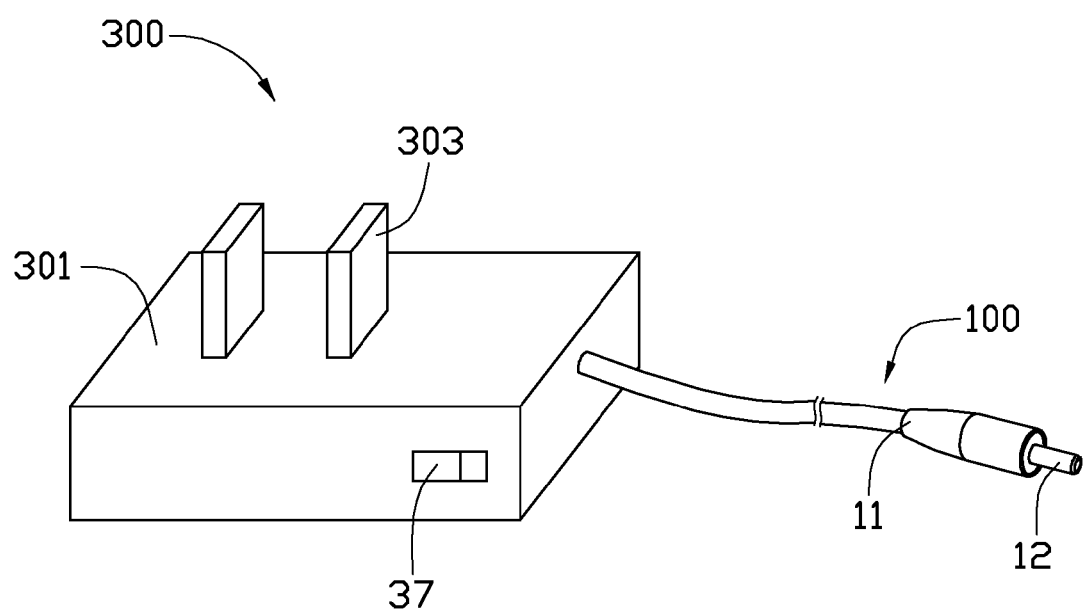
FIG. 3 is schematic, isometric view of a battery charger using the illuminating plug of FIG. 1.

Referring to FIG. 3, a battery charger 300 using the illuminating plug 100 in according with one embodiment of present disclosure is shown. The battery charger 300 includes a transformer box 301 and the illuminating plug 100. The transformer box 301 is square-shaped and includes two metal conductors 303 arranged to electrically connect to an external alternating current (AC) or a direct current (DC) power supply from a first external circuit (not shown). The transformer box 301 further includes a regulator (not shown) therein for providing a stable DC voltage to a second external circuit (not shown). A switch 37 is formed on the transformer box 301 and electrically connected to the illuminating unit 13 for controlling an operation of the illuminating unit 13.

In operation, the battery charger 300 is connected to the external AC or the DC power supply of the first external circuit for receiving an operation voltage. The regulator of the battery charger 300 transforms the operation voltage to a stable DC voltage and output the stable DC voltage to the terminal 12 via the cable 11. When the terminal 12 of the illuminating plug 100 is inserted into a socket of the external second circuit (not shown), the stable DC voltage charges a battery of the second external circuit. Because the illuminating unit 13 is electrically connected to the wires 111, 112 of the cable 11, the illuminating unit 13 light up when the stable DC voltage is provided to the terminal 12 via the cable 11. The light emitting from the illuminating unit 13 illuminate the terminal 12 and the corresponding socket of the second external circuit. Thus, such illumination allows the user to conveniently locate the corresponding socket in darkness. This makes the battery charger 300 more convenient to use.

In one alternating embodiment, the transformer box 301 can include three metal conductors and the configuration of the transformer box 301 can be formed in other type such as ellipsoidal-shape. The switch 37 can also be formed on the illuminating plug 302. In further alternating embodiment, a battery is positioned inside the transformer box 301 and electrically connected to the illuminating unit 13 for providing an operation voltage to the illuminating unit 13 in replacement of the stable DC voltage.

Figure 4:
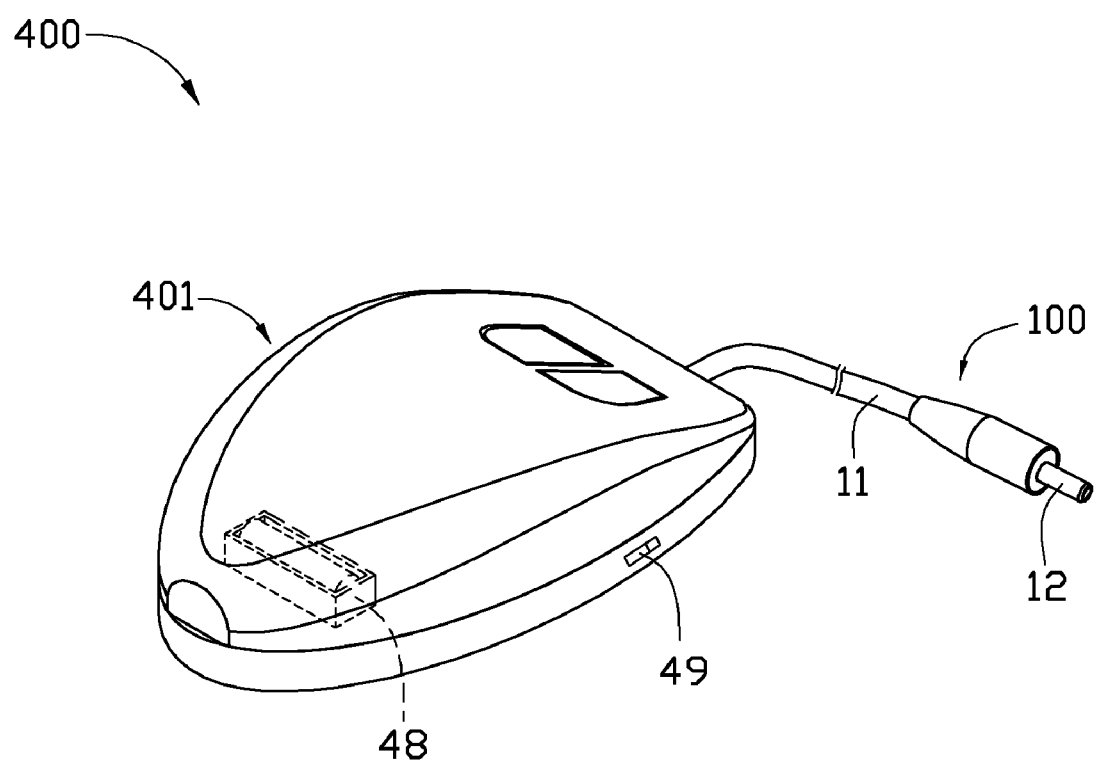
FIG. 4 is schematic, isometric view of a mouse using the illuminating plug of FIG. 1.

Referring to FIG. 4, a mouse 400 using the illuminating plug 100 according with one embodiment of the present disclosure is shown. The mouse 400 includes a position detector 401 and the illuminating plug 100.

Two ends of the cable 11 are respectively connected to the terminal 12 and position detector 401. The terminal 12 is used to electrically connect to a corresponding socket of a mainboard of a computer (not shown) for transmitting signals between the computer and the position detector 401.

The mouse 400 further includes a power supply 48 and a switch 49. The power supply 48 is positioned inside the position detector 401 and electrically connected to the illuminating unit 13 (not shown) for providing an operation voltage to the illuminating unit 13. The switch 49 is formed on a side wall of the position detector 49 for turning on and turning off the illuminating unit 13.

When the mouse 400 needs to be electrically connected to a computer in darkness, a user can turn on the illuminating unit 13 by the switch 49 to illuminate the terminal 12 and the socket of the computer, then inserts the terminal 12 into the corresponding socket of the computer. Because the terminal 12 and the socket of the computer are illuminated by light emitting from the illuminating unit 13 can be observed, the inserting operation is simple. This makes the mouse 400 more convenient for use.

It is to be understood, however, that even though numerous characteristics and advantages of certain inventive embodiments have been set out in the foregoing description, together with details of the structures and functions of the embodiments, the disclosure is illustrative only; and that changes may be made in detail, especially in matters of arrangement of parts within the principles of present invention to the full extent indicated by the broad general meaning of the terms in which the appended claims are expressed.

What is claimed is:

1. An illuminating plug comprising:
    a cable;
    a terminal electrically connected to the cable;
    an illuminating unit formed on the cable;
    a light guiding layer covering around the cable and optically coupled to the illuminating unit, the light guiding layer comprising a light emitting surface formed adjacent to the terminal, wherein light emitting from the illuminating unit reaches the light emitting surface through the light guiding layer and emits out to illuminate at least the terminal; and
    a reflecting layer covering the illuminating unit and the light guiding layer.

2. The illuminating plug of claim 1, wherein the light emitting surface is approximately perpendicular to an axis of the terminal.

3. The illuminating plug of claim 1, wherein the light emitting surface comprises a plurality of micro-lenses formed thereon to focus the light emitting from the light emitting surface to a top of the terminal.

4. The illuminating plug of claim 1, wherein the terminal is column-shaped with an inserting hole defined therein along an axis of the column-shaped terminal.

5. The illuminating plug of claim 4, wherein the terminal comprises a first electrode around outer surface, a second electrode in the inserting hole, and an insulating layer sandwiched therebetween.

6. The illuminating plug of claim 1, wherein the light guiding layer is made of polymethyl methacrylate (PMMA).

7. The illuminating plug of claim 1, wherein the light emitting surface is ring-shaped.

8. The illuminating plug of claim 1, further comprising a switch for turning on and turning off the illuminating unit.

9. The illuminating plug of claim 8, wherein the illuminating unit is electrically connected to the cable for receiving an operation voltage.

10. The illuminating plug of claim 8, further comprising a battery electrically connected to the illuminating unit for providing an operation voltage to the illuminating unit.

11. The illuminating plug of claim 1, wherein the illuminating unit comprises at least one light emitting diode.

12. A battery charger comprising a transformer box and an illuminating plug connected with the transformer box, the illuminating plug comprising:
    a cable;
    a terminal electrically connected to the cable;
    an illuminating unit formed on the cable;
    a light guiding layer covering around the cable and optically coupled to the illuminating unit, the light guiding layer comprising a light emitting surface formed adjacent to the terminal, wherein light emitting from the illuminating unit reaches the light emitting surface through the light guiding layer and emits out to illuminate at least the terminal; and
    a reflecting layer covering the illuminating unit and the light guiding layer.

13. The battery charger of claim 12, wherein the light emitting surface is approximately perpendicular to an axis of the terminal.

14. The battery charger of claim 12, wherein the light emitting surface comprises a plurality of micro-lenses formed thereon to focus the light emitting from the light emitting surface to a top of the terminal.

15. The battery charger of claim 12, wherein the terminal is column-shaped with an inserting hole defined along an axis of the column-shaped terminal, and the terminal comprises a first electrode around outer surface, a second electrode in the inserting hole and an insulating layer sandwiched therebetween.

16. The battery charger of claim 12, wherein the illuminating unit is electrically connected to the cable for receiving an operation voltage.

17. The battery charger of claim 12, further comprising a battery electrically connected to the illuminating unit for providing an operation voltage to the illuminating unit, and a switch for turning on and turning off the illuminating unit.

18. A mouse device comprising a battery, a position detector and an illuminating plug connected to the position detector, the illuminating plug comprising:
- a cable;
- a terminal electrically connected to the cable;
- an illuminating unit formed on the cable and electrically connected to the battery for receiving an operation voltage;
- a light guiding layer covering around the cable and optically coupled to the illuminating unit, the light guiding layer comprising a light emitting surface formed adjacent to the terminal, wherein light emitting from the illuminating unit reaches the light emitting surface through the light guiding layer and emits out to illuminate at least the terminal; and
- a reflecting layer covering the illuminating unit and the light guiding layer.

19. The mouse device of claim 18, wherein further comprising a switch for turning on and turning off the illuminating unit.

20. The mouse device of claim 18, wherein the light emitting surface comprises a plurality of micro-lenses formed thereon to focus the light emitting from the light emitting surface to a top of the terminal.

* * * * *